United States Patent [19]

Kealy et al.

[11] 4,418,120
[45] Nov. 29, 1983

[54] TACKIFIED CROSSLINKED ACRYLIC ADHESIVES

[75] Inventors: Joanne P. Kealy, Maplewood, Minn.; Robert E. Zenk, River Falls, Wis.

[73] Assignee: Minnesota Mining and Manufacturing Co., St. Paul, Minn.

[21] Appl. No.: 399,350

[22] Filed: Jul. 19, 1982

[51] Int. Cl.³ .......................... C09J 7/02; B05D 1/36
[52] U.S. Cl. .................................. 428/343; 206/813; 206/411; 427/208.4; 428/355; 428/913
[58] Field of Search ...................... 428/343, 355, 913; 427/208.4; 526/298; 260/29.6 R; 206/59

[56] References Cited

U.S. PATENT DOCUMENTS

| Re. 24,906 | 12/1960 | Ulrich | 206/59 |
|---|---|---|---|
| 2,925,174 | 2/1960 | Stow | 206/59 |
| 2,973,286 | 2/1961 | Ulrich | 428/355 |
| 3,222,419 | 12/1965 | Jubilee et al. | 428/355 |
| 3,299,010 | 1/1967 | Samour | 428/355 |
| 3,400,103 | 9/1968 | Samour | 427/208.4 |
| 3,617,362 | 11/1971 | Bemmels et al. | 428/355 |
| 3,701,758 | 10/1972 | Maska | 526/298 |
| 3,707,518 | 12/1972 | Bemmels et al. | 260/29.6 |
| 3,740,366 | 6/1973 | Sanderson et al. | 260/29.6 |
| 4,077,926 | 3/1978 | Sanderson et al. | 260/29.6 |

OTHER PUBLICATIONS

EPA 79900506.1, based on PCT Application US79/00288, filed Apr. 30, 1979; Publ. 11/29/79.

*Primary Examiner*—Thomas J. Herbert, Jr.
*Attorney, Agent, or Firm*—Donald M. Sell; James A. Smith; Richard E. Brink

[57] ABSTRACT

Pressure-sensitive adhesive tape is made by coating a sheet backing with a solution of iso-octyl acrylate:acrylic acid copolymer containing a tackifying rosin ester and an anti-oxidant, evaporating the solvent, and crosslinking the adhesive. The resultant adhesive has an excellent balance of the tack, peel adhesion, and shear properties, even at 70° C., and adheres well to low energy surfaces.

7 Claims, No Drawings

TACKIFIED CROSSLINKED ACRYLIC ADHESIVES

BACKGROUND OF THE INVENTION

This invention relates to pressure-sensitive adhesive-coated sheet material and is especially concerned with pressure-sensitive tapes, including adhesive transfer tape, which have excellent tack, excellent shear properties at both room temperature and elevated temperatures, and good adhesion to steel and a variety of polymeric substrates.

Three properties which are useful in characterizing the nature of pressure-sensitive adhesives are tack, peel, and shear. The first measures the adhesive's ability to adhere quickly, the second its ability to resist removal by peeling, and the third its ability to hold in position when shearing forces are exerted. Generally speaking, the first two are directly related to each other but are inversely related to the third; cf., e.g., Sanderson U.S. Pat. No. 4,077,926, Col. 1, lines 31–36.

Modern industry presents a number of situations where pressure-sensitive adhesive products having balanced properties (i.e., excellent tack, peel, and shear) would be highly desirable. For example, to attach gasketing and weatherstripping materials in automotive and other industrial applications, there is a need for a pressure-sensitive adhesive which possesses a high tack as well as a high shear under such environmental conditions as will be encountered in use as the result of high and low temperatures, humidities, etc. A typical application involves the application of neoprene door and trunk lid gaskets to automobiles; the gasketing is continually under stress, often at high temperatures, making it essential that the mounting adhesive possess both high shear and high adhesion. Another application involves the lamination of sound-absorbing foam in truck cabs and electronic equipment cabinets; the foam, which is curved to fit the available space, seeks to return to its original dimensions, thereby exerting a constant stress on the adhesive. Still other demanding applications for pressure-sensitive adhesives include the industrial processing of film, fabric, carpet, or paper webs which must be spliced so as to retain their integrity when thereafter passed through high temperature ovens, the lamination of non-slip pads to polyethylene surf boards, the bonding of polyvinyl fluoride wall coverings to bulkheads in passenger aircraft, the adhesion of polyolefinbacked carpet to metallic substrates, etc. As a result of these needs, many persons have tried to prepare a pressure-sensitive adhesive having balanced properties (i.e., excellent tack, peel and shear), especially at elevated temperatures.

It has long been recognized that adhesives that consist essentially of a copolymer of alkyl acrylate and a minor proportion of copolymerizable monomer such as acrylic acid do not require a tackifying resin and are able to resist aging; thus, such adhesives have advantages over the earlier and more traditional rubber-resin adhesives; cf. Ulrich U.S. Pat. No. Re. 24,906. Although acrylate pressure-sensitive adhesives can be prepared as either solutions or aqueous emulsions, the latter are typically employed because of the higher molecular weight and percentage solids attainable at a practical coating viscosity.

The early so-called acrylate adhesives were somewhat heat-sensitive (cf., e.g., Bemmels U.S. Pat. No. 3,617,362 and 3,707,518), and crosslinking has been proposed. Unfortunately, the improved heat resistance and holding power obtained by crosslinking have been generally offset by the loss in tack. Sanderson U.S. Pat. Nos. 3,740,366 and 4,077,926 discuss improving heat resistance of acrylate adhesives by crosslinking with, e.g., zinc octoate or trivalent chromium ion; the adhesion and shear values obtained are not high enough for use in, e.g., the automotive applications discussed above. These patents also suggest that such conventional additives as tackifiers may be included but do not enlarge on this point.

Maska U.S. Pat. No. 3,701,758 discloses a pressure-sensitive adhesive formed from cyanoacrylate polymers which is said to have a balance of tack, adhesion, and cohesion, even at temperatures of 50°–100° C. This adhesive may (but usually does not) include a tackifier, and no mention is made of crosslinking; its low tack and adhesion values render it unsatisfactory for bonding firmly to such low energy surfaces as neoprene or polyethylene. Jubilee U.S. Pat. No. 3,222,419 discloses a terpolymer of vinyl acetate, acrylate or methacrylate, and a crosslinkable resin, the resultant product being said to have a balance of tack, adhesion and cohesion, as well as the ability to adhere to a wide variety of substrates; unfortunately, however, the adhesive has low heat resistance. Hydrogenated rosin ester may be included as a tackifying agent; this adhesive does not, however, perform well at elevated temperatures.

Samour U.S. Pat. Nos. 3,299,010 and 3,400,103 disclose pressure-sensitive adhesives of the acrylate:acrylic acid family which may be cured or crosslinked, suggesting that any of a wide variety of tackifying resins might be included but failing to provide any details; it appears that these patents illustrate the general principle that it has heretofore been possible to improve one adhesive property only at the sacrifice of others. Published European Patent Application EPA 79900506.1 (based on PCT application U.S. 79/00288, filed Apr. 30, 1979, published Nov. 29, 1979) describes an acrylate:acrylic acid adhesive which is prepared in solution and crosslinked with 0.002–0.2 weight percent $Cr^{+++}$ to obtain a product having good initial adhesion and internal strength at high temperatures. This adhesive, however, does not have sufficiently high adhesion for use on some or all of such low energy surfaces as acrylonitrile:butadiene:styrene (ABS) terpolymer, low density polyethylene and isotactic polypropylene.

In recent years acrylate-based adhesives that possess a balance of high tack, high peel, and high shear properties have been prepared by coating a blend of such monomers as iso-octyl acrylate and acrylic acid on a backing, maintaining an inert atmosphere, and polymerizing the blend in situ. The commercial preparation of such tape products, however, requires a substantial investment in unconventional manufacturing equipment. Further, even these products have not possessed the desired uniformly excellent adhesion to low energy polymeric substrates.

Prior to the present invention, then, there has been a need for pressure-sensitive adhesive tape products which not only have balanced properties at wide temperature ranges and adhere well to low energy surfaces but also can be prepared easily and economically on conventional equipment.

BRIEF DESCRIPTION OF THE INVENTION

The present invention provides pressure-sensitive adhesive products which not only display balanced properties at elevated temperature but also can be made simply and economically. These adhesive products have excellent adhesion to low energy surfaces. In accordance with the invention, there is provided normally tacky and pressure-sensitive adhesive tape comprising a sheet material having, on at least one surface, a thin layer of normally tacky and pressure-sensitive adhesive containing trace amounts of solvent and consisting essentially of a blend of a. a crosslinked pressure-sensitive copolymer of 100 parts by weight of monomers consisting essentially of iso-octyl acrylate (or 2-ethyl hexylacrylate) and 3–7 parts by weight of acrylic acid, said copolymer, prior to crosslinking, being soft, tacky, and having an inherent viscosity on the order of 0.75–1.5 dl/g, b. a small amount of an antioxidant that is based on either a hindered phenol or sulfur-containing organo-metal salt, and c. a tackifying rosin ester, said adhesive being characterized by a rolling ball tack value of less than 6 cm; an ability to bond firmly to stainless steel, ABS terpolymer, low density polyethylene, and isotactic polypropylene; and a shear value of at least 5,000 minutes at 70° C.

A presently preferred type product according to the invention is made by a. blending
  (1) an organic solvent solution of pressure-sensitive iso-octyl acrylate:acrylic acid copolymer having an inherent viscosity on the order of 0.75–1.5 dl/g,
  (2) an effective amount of hindered phenol antioxidant, and
  (3) a tackifying rosin ester, b. adding an organic solvent solution of N,N'-bis-1,2-propyleneisophthalamide crosslinker and continuing to blend the ingredients to form a reactive adhesive solution, c. coating a thin layer of the adhesive solution on a sheet backing, and d. heating the coated sheet backing to remove most of the solvent and react the copolymer and crosslinker.

In products and processes of the invention, the adhesive is typically permanently bonded to the sheet backing. For some applications, however, the sheet backing may be a release liner, so that the finished product is a so-called transfer tape; in use, the exposed adhesive surface of this tape is placed in contact with a desired substrate, the release liner stripped away, and the newly exposed adhesive surface bonded to a second substrate.

As is evident from the process of the invention, the copolymer is provided in organic solvent solution rather than in aqueous emulsion. The latter contain surfactants, which complicate formulating the tape of the invention because of interference with certain crosslinking agents. Further, a surfactant in an adhesive tends to migrate to the surface, where it often reduces bond strength. Thus, adhesives used in preparing tapes of the invention may be characterized as at least substantially (preferably completely) surfactant-free.

DETAILED DESCRIPTION

Test Procedures

A number of industry-recognized tests are commonly employed to characterize the performance of normally tacky and pressure-sensitive adhesive tapes. A brief summary of the tests employed to evaluate adhesives herein is described below:

Peel Adhesion. The test is a modification of PSTC-1, described in "Test Methods for Pressure-Sensitive Tapes," 7th Edition, Pressure-Sensitive Tape Council, Glenview, Ill., 1976. A solution of the adhesive to be tested is coated on a release liner in a quantity such that, upon evaporation of the solvent, the weight of adhesive remaining is approximately 100 g/m$^2$. The exposed surface of the adhesive is then laminated to a 50-micrometer thick aluminum foil that has been primed by coating with epoxidized polybutadiene reacted with dimethylamine, thereby forming a pressure-sensitive adhesive tape. Strips 15 cm long and 2.54 cm wide are cut from the tape and placed in contact with the substrate to which adhesion is to be determined. The liner is removed and, using two passes of a 2.05 kg roller, the adhesive surface of the tape is forced into contact with the substrate. One end of the tape is doubled back on itself at 180°, the exposed portion of the substrate being clamped in the upper jaws of a tensile testing machine while the doubled-back end of the tape is clamped in the lower jaws. The jaws are then separated at a rate of 30.5 cm/minute, the force to effect separation being reported in g/cm width. Where the substrate is stainless steel, this force should be at least 800 (preferably 1,100) g/cm width for adhesives useful in practicing the present invention. Where the substrate is ABS terpolymer, low density polyethylene, or isotactic polypropylene, the force required to effect removal should be at least 700 (preferably 1,000) g/cm, 560 (preferably 670) g/cm, and 670 (preferably 780) g/cm respectively.

Tack Rolling Ball Test. In this test an 11-mm diameter steel ball is rolled down a plane having a length of 18 cm and inclined at an angle of 21°30' to a horizontal surface on which is positioned, adhesive side up, the tape to be evaluated, the adhesive thickness being at least 25 micrometers. The distance the ball rolls along the horizontal adhesive surface is measured, the tack being inversely proportional to the distance. Further details of this test are found in the aforementioned Test Methods for Pressure-Sensitive Tapes. Adhesives used in the practice of this invention should have a rolling ball tack value of no more than 6.0 cm and preferably less than 2.5 cm.

Shear Adhesion (Holding Power). As used herein, this test is a modification of PSTC-7, described in the same publication referred to in the previous tests. A 1.27-cm×2.54-cm specimen of the adhesive described in the preceding two tests is mounted on a 7.5-cm×20-cm stainless steel panel and an aluminum foil, both primed as previously described, is adhered thereto. The panel is then positioned with its long dimension at 2° from vertical so that the back of the panel forms an angle of 178° with the extended piece of tape, the 2.54-centimeter dimension of the adhesive extending in the vertical direction. The assembly is then placed in a 70° C. oven and a 1 kg weight attached to the free end of the tape. The cohesive strength of the adhesive is less than its adhesion to either the primed steel panel or the primed web, and the time required for the adhesive to fail cohesively, as evidenced by the tape's falling free from the panel, is reported in minutes. Generally speaking, adhesives used in the practice of this invention should have a shear adhesion value of at least 5,000 minutes.

For simplicity in reporting test results, a number of abbreviations have been employed. The significance of these abbreviations is set forth below:

| Acrylate Copolymer | |
|---|---|
| IOA | Iso-octyl acrylate, or 2-ethyl hexyl acrylate |
| AA | Acrylic acid |
| I.V. | Inherent Viscosity, dl/g |
| Tackifier | |
| F85 | Glycerol ester of highly stabilized rosin, having an acid number of 9 and a softening point of 82° C., available from Hercules, Inc. under the trade designation "Foral" 85. |
| F105 | Pentaerythrithol ester of hydrogenated rosin, having an acid number of 12 and a softening point of 104° C., available from Hercules, Inc. under the trade designation "Foral" 105. |
| PEE | Glycerol ester of rosin, having an acid number of 7, commercially available from Hercules, Inc. under the trade designation "PE Estergum" |
| PEH | Pentaerythritol ester of partially hydrogenated rosin, having an acid number of 12 and a softening point of 104° C., commercially available from Hercules, Inc. under the trade designation "Pentalyn" H |
| SE10 | Glycerol ester of hydrogenated rosin, having an acid number of 8 and a softening point of 83° C., commercially available from Hercules, Inc. under the trade designation "Staybelite" Ester 10 |
| SE100 | Stabilized rosin ester, having an acid number of 7 and a softening point of 100° C., commercially available from Arakawa Chemical Industries, Ltd. under the trade designation "Super Ester" 100 |
| Z 85 | Glycerol-derived ester of disproportionated tall oil rosin, having an acid number of 7 and a softening point of 83° C., commercially available from Arizona Chemical Company under the trade designation "Zonester" 85 |
| SY40N | Modified rosin ester, commercially available from Sylvachem Corporation under the trade designation "Sylvatac" 40N. |
| Crosslinking Agents | |
| BA | N,N′—bis-1,2-propylenisophthalamide |
| TBT | Tetrabutyl titanate |
| CR8 | Chromium octoate |
| C303 | Hexamethoxymethyl melamine resin, commercially available from American Cyanamid Co. under the trade designation "Cymel" 303, 0.5 mole of p-toluene sulfonic acid catalyst being added to 100 parts by weight of adhesive at the time of us. |
| Substrates | |
| SS | Stainless steel |
| ABS | Acrylonitrile:butadiene:styrene terpolymer |
| LDPE | Low density polyethylene |
| IPP | Isotactic polypropylene |

Each of the examples tabulated below (in which all parts are by weight unless otherwise noted) was prepared by weighing into a suitable container (1) a solution of IOA:AA adhesive containing 100 parts solids, (2) tackifying resin, (3) antioxidant, and (if desired to lower viscosity) (4) a small amount of toluene. The ingredients were blended with a propeller mixer for about 30 minutes, after which (5) a crosslinking agent was added and mixing carried out an additional 10 minutes. After any entrained air bubbles had cleared from the solution, the composition was coated on a backing in conventional manner and dried in a hot air oven to evaporate the solvent. (It will be recognized, of course, that where either the tackifier, the crosslinking agent, or both are omitted, as in some of the comparative examples, the procedure is modified accordingly.)

| | Pressure Sensitive Adhesive Formulation | | | | | | | Test Values | | | | | |
|---|---|---|---|---|---|---|---|---|---|---|---|---|---|
| | Acrylate Polymer | | | Tackifier | | Crosslinker | | Rolling Ball Tack, | Adhesion to various substrates, N/cm Width | | | | Shear, minutes to fail |
| | Parts | Parts | | | | | | | | | LD | | |
| Example | IOA | AA | I.V. | Type | Parts | Type | Mols | Cm | SS | ABS | PE | IPP | at 70° C. |
| Acceptable | — | — | — | — | — | — | — | 6.0 | 800 | 700 | 560 | 670 | 1,000 |
| Preferred | — | — | — | — | — | — | — | 2.5 | 1100 | 1,000 | 670 | 780 | 5,000 |
| A (Comp.) | 94 | 6 | 1.5 | — | — | — | — | 1.9 | 1010 | 910 | 350 | 520 | 1 |
| B (Comp.) | 94 | 6 | 1.5 | F85 | 50 | — | — | 5.1 | 2020 | 1490 | 1390 | 1440 | 1 |
| C (Comp.) | 94 | 6 | 1.5 | — | — | BA | 0.37 | 0.3 | 1070 | 860 | 430 | 560 | >5,000 |
| 1 | 94 | 6 | 1.5 | F85 | 50 | BA | 0.37 | 3.0 | 1400 | 1110 | 760 | 1090 | >5,000 |
| 2 | 94 | 6 | 1.47 | F85 | 50 | BA | 0.37 | 0.3 | 1540 | — | 980 | 1050 | >5,000 |
| 3 | 94 | 6 | 1.26 | F85 | 50 | BA | 0.37 | 1.6 | 1430 | 1160 | 960 | 1650 | >5,000 |
| 4 | 94 | 6 | 1.05 | F85 | 50 | BA | 0.37 | 0.6 | 1540 | 1010 | 890 | 1050 | >5,000 |
| 5 | 94 | 6 | 0.85 | F85 | 50 | BA | 0.37 | 0.6 | 1680 | 1010 | 890 | 1050 | >5,000 |
| D (Comp.) | 94 | 6 | 0.85 | F85 | 50 | BA | 0.29 | 1.9 | 1460 | 1250 | 1120 | 1120 | 180 |
| 6 | 94 | 6 | 0.55 | F85 | 50 | BA | 0.37 | 1.3 | 810 | — | — | — | >5,000 |
| E (Comp.) | 94 | 6 | 0.55 | F85 | 20 | BA | 0.37 | 0.6 | 1060 | 1050 | 630 | 1610 | >5,000 |
| 7 | 94 | 6 | 0.55 | F85 | 20 | BA | 0.37 | 0.6 | 840 | 800 | 690 | 740 | >5,000 |
| 8 | 94 | 6 | 0.85 | F85 | 30 | BA | 0.37 | 5.7 | 1200 | 1000 | 800 | 900 | >5,000 |
| F (Comp.) | 94 | | 0.85 | F85 | 70 | BA | 0.37 | 12.7 | 2020 | 1660 | 1300 | 850 | >5,000 |
| 9 | 94 | 6 | 0.85 | F105 | 30 | BA | 0.37 | 1.0 | 1050 | 980 | 690 | 760 | >5,000 |
| G (Comp.) | 94 | 6 | 0.85 | F105 | 50 | BA | 0.37 | >10 | 1960 | 1790 | 1300 | 1190 | >5,000 |
| H (Comp.) | 94 | 6 | 0.85 | SY 40N F85 | 30 20 | BA | 0.37 | 1.0 | 1570 | 1520 | 940 | 940 | 8 |
| 10 | 94 | 6 | 0.85 | SE 100 | 30 | TBT | 2.0 | 1.3 | 1460 | 890 | 630 | 980 | >5,000 |
| 11 | 94 | 6 | 0.85 | PeH | 30 | TBT | 2.0 | 2.5 | 1120 | 830 | 690 | 740 | >5,000 |

-continued

| | Pressure Sensitive Adhesive Formulation | | | | | | | Test Values | | | | | |
| | Acrylate Polymer | | | Tackifier | | Crosslinker | | Rolling Ball Tack, Cm | Adhesion to various substrates, N/cm Width | | | | Shear, minutes to fail at 70° C. |
| | Parts | Parts | | | | | | | | | LD | | |
| Example | IOA | AA | I.V. | Type | Parts | Type | Mols | | SS | ABS | PE | IPP | |
| I (Comp.) | 94 | 6 | | SE 10 | 50 | TBT | 2.0 | 9.2 | 1900 | 1300 | 850 | 1230 | >5,000 |
| J (Comp.) | 94 | 6 | 0.85 | F85 | 50 | TBT | 1.33 | 1.0 | 1460 | 1160 | 1210 | 940 | 600 |
| 12 | 94 | 6 | 0.85 | F85 | 50 | TBT | 2.0 | 1.3 | 1460 | 940 | 690 | 890 | >5,000 |
| 13 | 94 | 6 | 0.85 | F85 | 50 | TBT | 2.67 | 1.6 | 1230 | 790 | 670 | 880 | >5,000 |
| 14 | 94 | 6 | 0.85 | F85 | 50 | TBT | 4.0 | 4.1 | 880 | 710 | 630 | 710 | >5,000 |
| K (Comp.) | 94 | 6 | 0.85 | Z85 | 50 | CR8 | | 12.7 | 1900 | 1570 | 890 | 1570 | >5,000 |
| 12 | 94 | 6 | 0.85 | F85 | 50 | CR8 | 0.79 | 0.6 | 1460 | 890 | 710 | 890 | >5,000 |
| L (Comp.) | 94 | 6 | 0.85 | | | C303 | 1.75 | 2.9 | 1570 | 1480 | 980 | 1480 | 5 |
| 13 | 94 | 6 | 0.85 | | | C303 | 3.49 | 5.8 | 730 | — | — | — | >5,000 |
| M (Comp.) | 90 | 10 | 1.5 | — | — | — | — | >15 | 900 | 990 | 220 | 550 | 5 |
| N (Comp.) | 90 | 10 | 1.5 | F85 | 50 | — | — | >15 | 1250 | 1340 | 400 | 870 | 4 |
| O (Comp.) | 90 | 10 | 1.5 | — | — | BA | | >15 | 950 | 820 | 170 | 410 | >5,000 |
| P (Comp.) | 90 | 10 | 1.5 | F85 | 50 | BA | | >15 | 1680 | 1400 | 540 | 990 | >5,000 |
| Q (Comp.) | 98 | 2 | 1.4 | — | — | — | — | 0 | 620 | 570 | 310 | 520 | 2 |
| R (Comp.) | 98 | 2 | 1.4 | F85 | 50 | — | — | 0 | 1120 | 970 | 680 | 880 | 0 |
| S (Comp.) | 98 | 2 | 1.4 | — | — | BA | | 0 | 560 | — | — | — | >5,000 |
| T (Comp.) | 98 | 2 | 1.4 | F85 | 50 | BA | | 3.5 | 680 | 600 | 450 | 560 | >5,000 |
| U (Comp.) | 98 | 2 | | F85 | 50 | TBT | 2.0 | 0.3 | 670 | 680 | 830 | 680 | |

It will be recognized that those skilled in the art will make numerous variations of the foregoing examples without departing from the spirit of the invention. To illustrate, while 94:6 iso-octyl acrylate:acrylic acid copolymers are especially preferred adhesives, copolymers having 93:7-97:3 monomer ratios are considered of excellent quality. Copolymers having a 90:10-98:2 monomer ratio may be satisfactory for many purposes, especially where it is desired to emphasize one property, e.g., shear, more than another, e.g., tack. Speaking in general terms, the higher the percentage of iso-octyl acrylate, the tackier the adhesive; conversely, the higher the percentage of acrylic acid, the higher the shear properties.

Changes in a given variable can also be compensated for by making appropriate changes in another variable. For example, the tackiness of either a high acrylate copolymer or a high molecular weight copolymer can be increased by reducing the amount of tackifier or using one of a lower molecular weight (lower softening temperature).

Although it has been found important to include both iso-octyl acrylate and acrylic acid as monomers in preparing the acrylate pressure-sensitive adhesive starting materials, additional monomers (e.g., itaconic acid, methacrylic acid, acrylamide, methacrylamide, vinyl acetate, n-butyl acrylate, etc., can be included in minor amounts; e.g., a 74:20:6 iso-octyl acrylate:n-butyl acrylate:acrylic acid terpolymer yields a useful adhesive product. Similarly, other acrylates derived from alcohols having 4-14 carbon atoms may be included, as is generally taught in U.S. Pat. No. Re. 24,906.

Any adhesive composition according to the invention must include an anti-oxidant to inhibit oxidation of the tackifying agent and consequent loss of tackiness as the adhesive composition ages. In this regard, it has been found important to use an anti-oxidant which is based on either (1) a hindered phenol or (2) a sulfur-containing organo-metal salt. Among the hindered phenols are the ortho-substituted or 2,5-di-substituted hindered phenols in which each substituent group is a branched hydrocarbon radical having 3-20 carbon atoms, e.g., tertiary butyl or tertiary amyl. Other hindered phenols useful in practicing the invention include para-substituted phenols where the substituent group is —OR, R being methyl, ethyl, 3-substituted propionic ester, etc. Among the sulfur-containing organo-metal salts are the nickel derivatives of dibutyl dithiocarbamate.

The foregoing examples have employed numerous crosslinking agents, but there are believed to be still others which would likewise be effective.

We claim:

1. Normally tacky and pressure-sensitive adhesive tape comprising a sheet material having, on at least one surface, a thin layer of normally tacky and pressure-sensitive adhesive containing trace amounts of solvent and consisting essentially of an at least substantially surfactant-free blend of (a) a crosslinked pressure-sensitive copolymer of 100 parts by weight of monomers consisting essentially of iso-octyl acrylate and 3-7 parts by weight of acrylic acid, said copolymer, prior to crosslinking being soft, tacky, and having an inherent viscosity on the order of 0.75-1.5 dl/g, (b) a small amount of an antioxidant that is based on either a hindered phenol or a sulfur-containing organo-metal salt, and (c) a tackifying rosin ester, said adhesive having the properties of (1) a rolling ball tack value of less than 6 cm, (2) an ability to bond firmly to stainless steel, ABS terpolymer, low density polyethylene, and isotactic polypropylene, and (3) a shear value of at least 5,000 minutes at 70° C.

2. The tape of claim 1 wherein the adhesion to stainless steel, ABS terpolymer, low density polyethylene, and isotactic polypropylene is at least 800, 700, 560 and 670 g/cm width respectively.

3. The tape of claim 1 wherein the adhesion to stainless steel, ABS terpolymer, low density polyethylene, and isotactic polypropylene is at least 1,100, 1,000, 670 and 780 g/cm width, respectively.

4. The tape of claim 1, 2 or 3 wherein the rolling ball tack value is no more than 2.5 cm.

5. The tape of claim 4 wherein the copolymer is a 94:6 iso-octyl acrylate:acrylic acid copolymer.

6. The tape of claim 5 wherein the copolymer is crosslinked with N,N'-bis-1,2-propyleneisophthalamide.

7. The method of making the tape of claim 1 which comprises the steps of
 a. blending
  (1) an organic solvent solution of pressure-sensitive iso-octyl acrylate:acrylic acid copolymer having an inherent viscosity on the order of 0.5–1.5 dl/g,
(2) an effective amount of hindered phenol antioxidant, and
(3) a tackifying rosin ester,
b. an organic solvent solution of N,N'-bis-1,2-propyleneisophthalamide crosslinker and continuing to blend the ingredients to form a reactive adhesive solution,
c. coating a thin layer of the adhesive solution on a sheet backing, and
d. heating the coated sheet backing to remove most of the solvent and react the copolymer and crosslinker.

* * * * *

UNITED STATES PATENT AND TRADEMARK OFFICE
CERTIFICATE OF CORRECTION

PATENT NO. : 4,418,120

DATED : November 29, 1983

INVENTOR(S) : Joanne P. Kealy and Robert E. Zenk

It is certified that error appears in the above—identified patent and that said Letters Patent is hereby corrected as shown below:

Column 9, line 6, after "b." there should be -- adding --

Signed and Sealed this

Fourteenth Day of August 1984

[SEAL]

Attest:

GERALD J. MOSSINGHOFF

Attesting Officer

Commissioner of Patents and Trademarks